(12) United States Patent
Chae et al.

(10) Patent No.: US 9,769,812 B2
(45) Date of Patent: Sep. 19, 2017

(54) METHOD AND APPARATUS FOR RECEIVING SYSTEM INFORMATION IN WIRELESS COMMUNICATION SYSTEM

(71) Applicant: LG ELECTRONICS INC., Seoul (KR)

(72) Inventors: Hyukjin Chae, Anyang-si (KR); Hanbyul Seo, Anyang-si (KR); Seungmin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/424,869

(22) PCT Filed: Sep. 23, 2013

(86) PCT No.: PCT/KR2013/008484
§ 371 (c)(1),
(2) Date: Feb. 27, 2015

(87) PCT Pub. No.: WO2014/046503
PCT Pub. Date: Mar. 27, 2014

(65) Prior Publication Data
US 2015/0237602 A1 Aug. 20, 2015

Related U.S. Application Data

(60) Provisional application No. 61/702,248, filed on Sep. 18, 2012.

(51) Int. Cl.
*H04W 72/04* (2009.01)
*H04B 7/08* (2006.01)

(52) U.S. Cl.
CPC ............ *H04W 72/042* (2013.01); *H04B 7/08* (2013.01)

(58) Field of Classification Search
None
See application file for complete search history.

(56) References Cited

U.S. PATENT DOCUMENTS 8,588,347 B1* 11/2013 Petrovic .................... H04L 1/08
375/260
2009/0046672 A1* 2/2009 Malladi ................. H04L 1/0067
370/336

(Continued)

FOREIGN PATENT DOCUMENTS

CN 102239647 A 11/2011
CN 102577197 A 7/2012

(Continued)

OTHER PUBLICATIONS

Nokia Siemens Networks et al., "CRC Mask Selection for PBCH," 3GPP TSG RAN WG1 #52 Meeting, R1-081073, Sorrento, Italy, Feb. 11-15, 2008, 8 pages.

(Continued)

*Primary Examiner* — Mohammad Adhami
*Assistant Examiner* — Vladislav Agureyev
(74) *Attorney, Agent, or Firm* — Birch, Stewart, Kolasch & Birch, LLP

(57) ABSTRACT

The method for receiving system information by a terminal in a wireless communication system according to one embodiment of the present invention comprises: a step of receiving a subframe; and a step of performing, for a physical broadcast channel (PBCH) in a predetermined resource region of the subframe, blind decoding based on a plurality of sequences to be masked to a CRC parity bit. If a cell-specific reference signal (CRS) does not exist in the subframe, each of the plurality of sequences indicates pieces of individual information contained in one or more of a reference signal type set, a demodulation reference signal (Continued)

(DMRS) antenna port information set and diversity scheme information set.

9 Claims, 9 Drawing Sheets

(56) References Cited

U.S. PATENT DOCUMENTS

| | | | | |
|---|---|---|---|---|
| 2010/0002800 | A1* | 1/2010 | Kim | H04L 5/0037 375/295 |
| 2010/0278073 | A1* | 11/2010 | Bhavanam | H04L 12/24 370/254 |
| 2010/0302978 | A1* | 12/2010 | Roh | H04B 7/024 370/310 |
| 2010/0303013 | A1 | 12/2010 | Khandekar et al. | |
| 2011/0044250 | A1* | 2/2011 | Han | H04B 7/0689 370/328 |
| 2011/0149886 | A1* | 6/2011 | Xu | H04B 7/0628 370/329 |
| 2011/0235743 | A1* | 9/2011 | Lee | H04L 5/0048 375/295 |
| 2011/0249602 | A1* | 10/2011 | Wennstrom | H04L 1/0041 370/310 |
| 2011/0255505 | A1* | 10/2011 | Liu | H04L 5/0007 370/330 |
| 2011/0286406 | A1* | 11/2011 | Chen | H04L 1/1861 370/329 |
| 2011/0293037 | A1* | 12/2011 | Liu | H04L 5/001 375/295 |
| 2012/0076102 | A1* | 3/2012 | Ko | H04B 7/0689 370/329 |
| 2012/0176884 | A1* | 7/2012 | Zhang | H04B 7/024 370/203 |
| 2012/0208583 | A1 | 8/2012 | Chung et al. | |
| 2012/0250642 | A1* | 10/2012 | Qu | H04W 48/12 370/329 |
| 2013/0044664 | A1* | 2/2013 | Nory | H04L 1/0045 370/311 |
| 2013/0064216 | A1* | 3/2013 | Gao | H04L 5/0016 370/330 |
| 2013/0114419 | A1* | 5/2013 | Chen | H04L 5/0053 370/248 |
| 2013/0163530 | A1* | 6/2013 | Chen | H04W 72/04 370/329 |
| 2013/0194931 | A1* | 8/2013 | Lee | H04L 5/0053 370/241 |
| 2013/0201932 | A1 | 8/2013 | Ko et al. | |
| 2013/0229972 | A1 | 9/2013 | Lee et al. | |
| 2013/0242882 | A1* | 9/2013 | Blankenship | H04W 72/042 370/329 |
| 2013/0250879 | A1* | 9/2013 | Ng | H04W 72/042 370/329 |
| 2013/0279437 | A1* | 10/2013 | Ng | H04W 48/16 370/329 |
| 2013/0301565 | A1* | 11/2013 | Xu | H04W 72/048 370/329 |

FOREIGN PATENT DOCUMENTS

| | | |
|---|---|---|
| KR | 10-2011-0020668 A | 3/2011 |
| KR | 10-2012-0025559 A | 3/2012 |
| KR | 10-2012-0049156 A | 5/2012 |
| WO | WO 2010/085909 A1 | 8/2010 |
| WO | 2011/078631 A2 | 6/2011 |
| WO | WO 2011/149286 A2 | 12/2011 |

OTHER PUBLICATIONS

Sharp, "Common search space in ePDCCH and fallback operation in Rel-11," 3GPP TSG RAN WG1 Meeting #69, R1-122390, Prague, Czech Republic, May 21-25, 2012, pp. 1-6.

* cited by examiner

FIG. 5
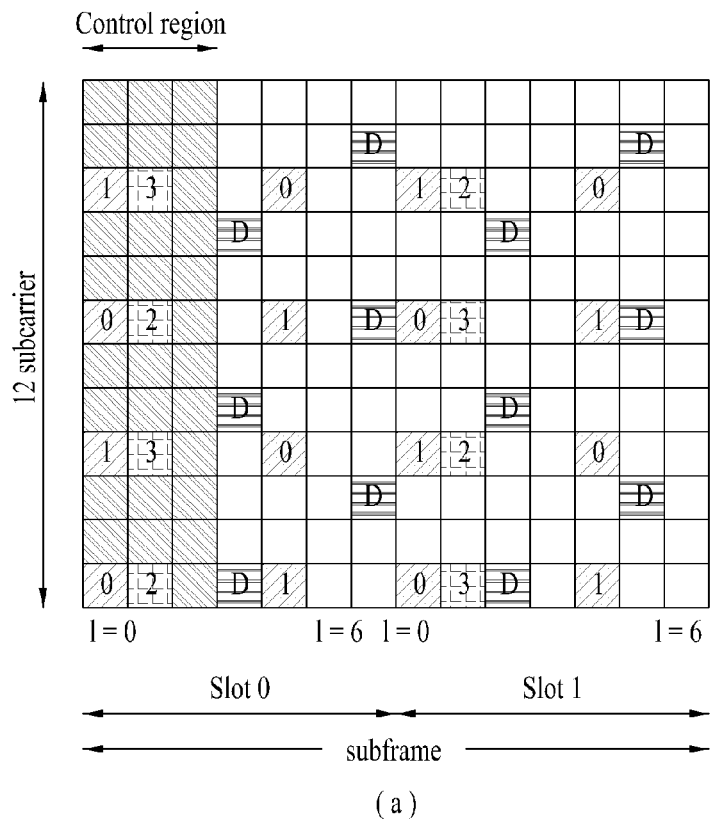
(a)
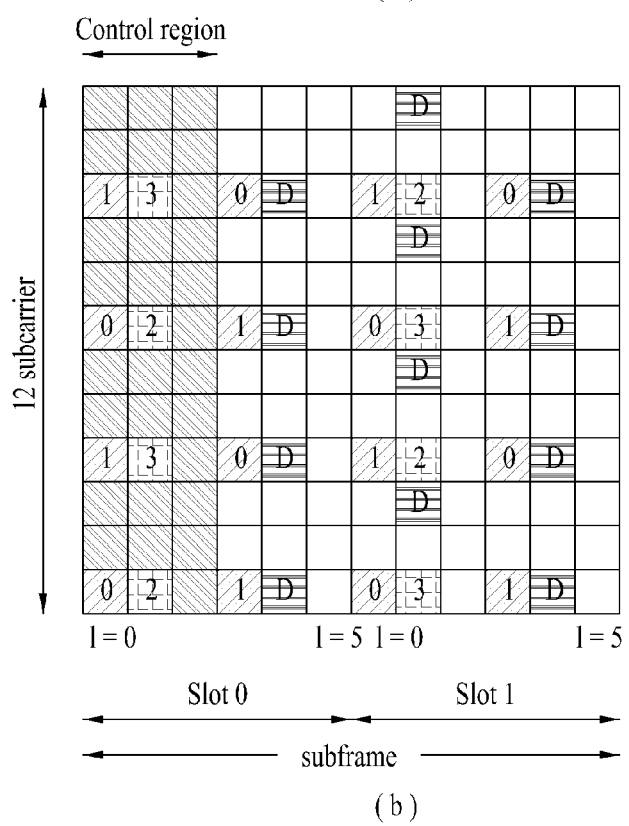
(b)

METHOD AND APPARATUS FOR RECEIVING SYSTEM INFORMATION IN WIRELESS COMMUNICATION SYSTEM

CROSS REFERENCE TO RELATED APPLICATIONS

This application is the National Phase of PCT International Application No. PCT/KR2013/008484, filed on Sep. 23, 2013, which claims priority under 35 U.S.C. 119(e) to U.S. Provisional Application No. 61/702,248, filed on Sep. 18, 2012, all of which are hereby expressly incorporated by reference into the present application.

TECHNICAL FIELD

The present disclosure relates to a wireless communication system, and more particularly, to a method and apparatus for receiving system information.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention is to define elements which are needed in transmitting system information on a new carrier.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

According to a first aspect of the present invention, provided herein is a method for receiving system information at a user equipment (UE) in a wireless communication system, the method including receiving a subframe, and performing blind decoding for a physical broadcast channel (PBCH) in a predetermined resource region of the subframe, based on a plurality of sequences masked on CRC parity bits, wherein, when a cell-specific reference signal (CRS) is not present in the subframe, each of plurality of the sequences indicates individual information contained in at least one of a type-of-reference signal set, a demodulation reference signal (DMRS) antenna port information set and a diversity scheme information set.

According to a second aspect of the present invention, provided herein is a user equipment in a wireless communication, including a transmit module, and a processor, wherein the processor is configured to perform blind decoding for a physical broadcast channel (PBCH) in a predetermined resource region of a received subframe, based on a plurality of sequences masked on CRC parity bits, wherein, when a cell-specific reference signal (CRS) is not present in the subframe, each of plurality of the sequences indicates individual information contained in at least one of a type-of-reference signal set, a demodulation reference signal (DMRS) antenna port information set and a diversity scheme information set.

The first and second aspects of the present invention may include the following details.

When each of plurality of the sequences indicates the individual information contained in the DMRS antenna port information set, the individual information may be DMRS port numbers associated with decoding of the system information.

When the CRS is present in the subframe, plurality of the sequences indicating 1, 2 and 4 as the number of antenna ports may indicate DMRS antenna ports {7}, {7, 9}, and {7, 8, 9, 10}, respectively.

When each of plurality of the sequences indicates the individual information contained in the type-of-reference signal set, the individual information may include a tracking reference signal and a DMRS.

When the CRS is present in the subframe, a sequence indicating 1 as the number of antenna ports may indicate a tracking reference signal as a type of a reference signal associated with decoding of the system information, and another sequence indicating a value greater than or equal to 2 as the number of antenna ports may indicate the DMRS as the type of the reference signal associated with decoding of the system information.

When the CRS is present in the subframe, plurality of the sequences indicating 2 and 4 as the number of antenna ports may indicate DMRS antenna ports {7, 9} and {7, 8, 9, 10}, respectively.

When each of plurality of the sequences indicates the individual information contained in the diversity scheme information set, and the CRS is present in the subframe, a sequence indicating 2 as the number of antenna ports may indicate that precoding of the system information has been performed based on the following table:

|  | Frequency unit resource n | Frequency unit resource n + 1 |
| --- | --- | --- |
| Antenna port 0 | S0 | S1 |
| Antenna port 1 | −S1* | S0* |

(Sx denotes system information mapped to layer x, and *denotes a complex conjugate).

When each of plurality of the sequences indicates the individual information contained in the diversity scheme information set, and the CRS is present in the subframe, a sequence indicating 4 as the number of antenna ports may indicate that precoding of the system information has been performed based on the following table:

|              | Frequency unit resource n | Frequency unit resource n + 1 | Frequency unit resource n + 2 | Frequency unit resource n + 3 |
|---|---|---|---|---|
| Antenna port 0 | S0   | S1   | 0    | 0    |
| Antenna port 1 | 0    | 0    | S2   | S3   |
| Antenna port 2 | −S1* | S0*  | 0    | 0    |
| Antenna port 3 | 0    | 0    | −S3* | S2*  |

(Sx denote system information mapped to layer x, and *denotes a complex conjugate).

When each of plurality of the sequences indicates the individual information contained in the diversity scheme information set, and the predetermined resource region includes fewer than 6 resource blocks, a precoding matrix used in transmitting the system information may have a matrix according to the following table as a constituent matrix:

| Number of layers | Constituent matrix |
|---|---|
| 2 | $\begin{bmatrix} 1 & 0 \\ 0 & e^{-j2\pi i/2} \end{bmatrix}$ |
| 3 | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

The number of antenna ports used for the system information may be delivered to a UE receiving data multiplexed in a resource block for transmission of the system information.

The subframe may be a first subframe of a radio frame.

The performing of the blind decoding may include performing a module 2 operation by adding one of plurality of the sequences to a CRC parity bit part, and dividing bits including the parity part determined through the modulo operation by a generation polynomial.

When a physical downlink shared channel (PDSCH) and the PBCH are multiplexed in the subframe, and a first antenna port associated with the PDSCH differs from a second antenna port associated with the PBCH, the UE may perform rate matching in consideration of the second antenna port in receiving the PDSCH.

Advantageous Effects

According to embodiments of the present invention, a UE may smoothly acquire system information even if the system information is transmitted on a new carrier on which a cell-specific reference signal is not transmitted.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a reference signal;

BEST MODE

Figure 1:
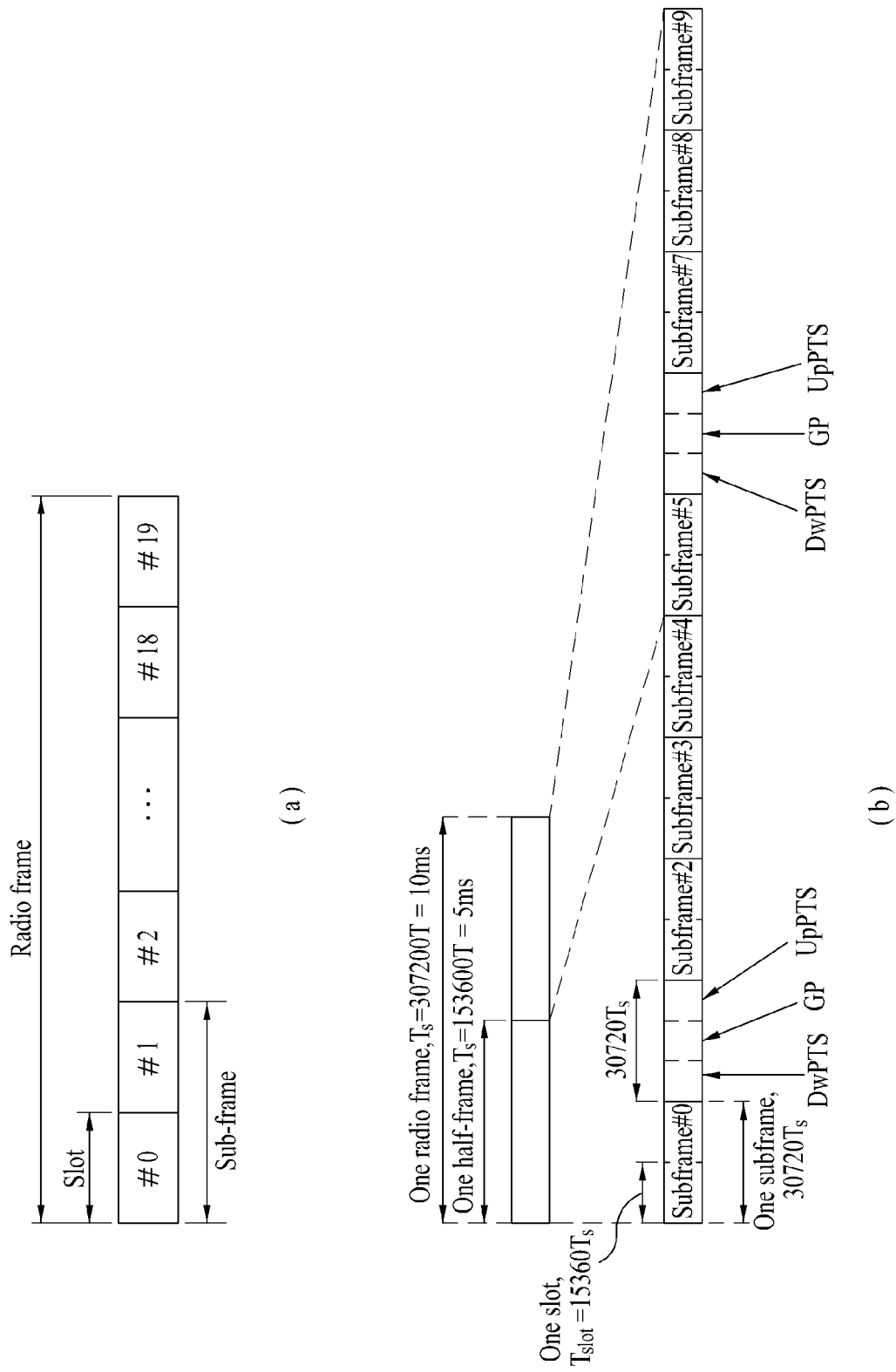
FIG. 1 illustrates a radio frame structure.

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

Generals of LTE/LTE-A system to which the present invention is applicable

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots. The illustrated radio frame structures are merely examples, and various modifications may be made to the number of subframes included in a radio frame, the number of slots included in a subframe, or the number of symbols included in a slot.

Figure 2:
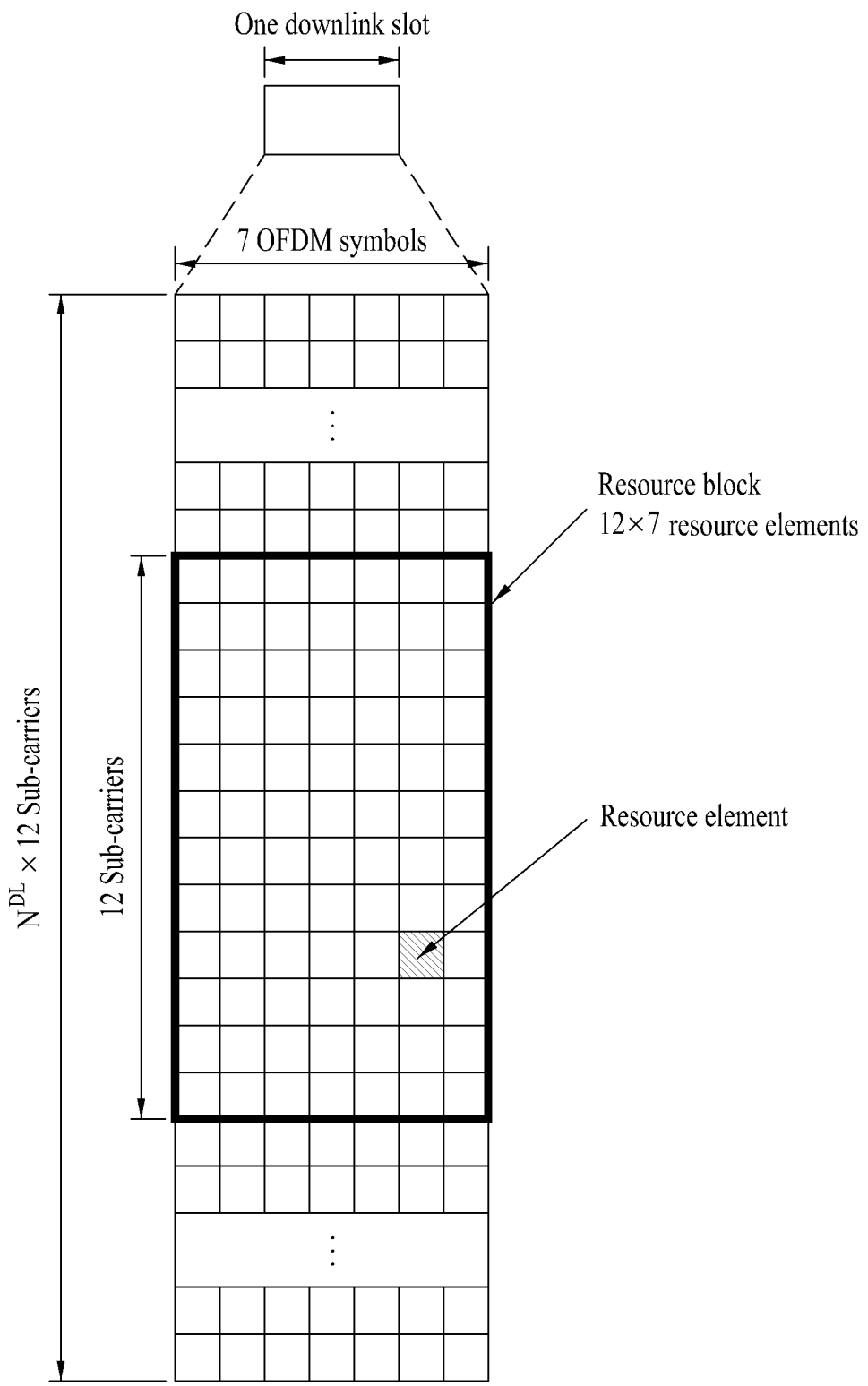
FIG. 2 is a diagram illustrating a resource grid for one downlink (DL) slot.

FIG. 2 is a diagram illustrating a resource grid of a DL slot. The DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12×7 REs. The number $N^{DL}$ of RBs included in a DL slot depends on a DL transmission bandwidth. A UL slot may have the same structure as the DL slot.

Figure 3:
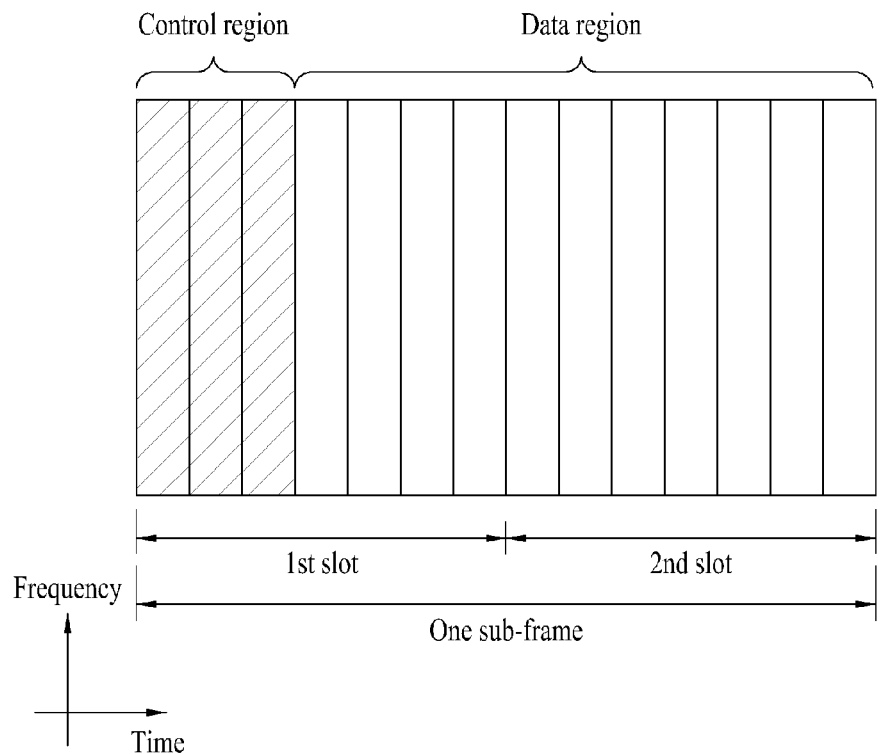
FIG. 3 is a diagram illustrating a DL subframe structure.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
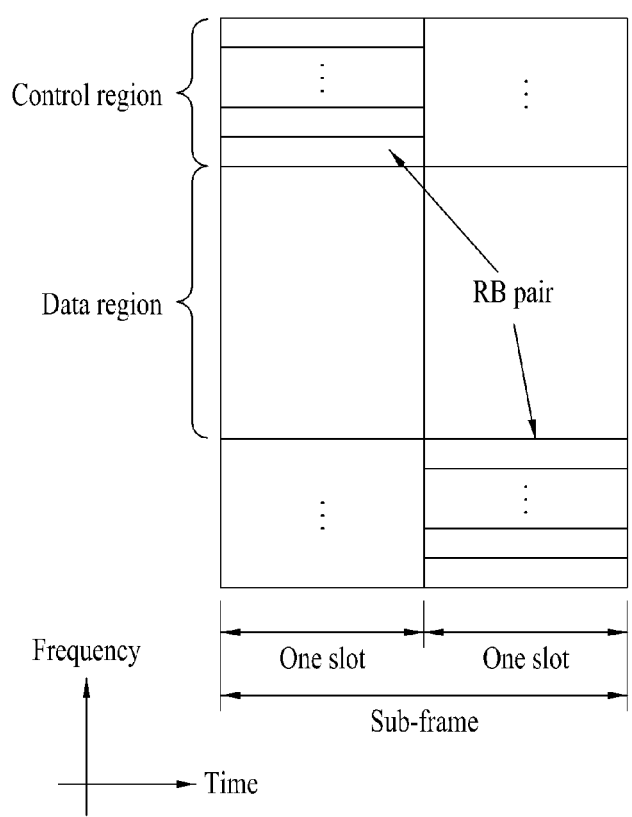
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a LIE is allocated to an RB pair in a subframe. The RBs from an RB pair occupy different subcarriers in two slots. This is called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the extent of distortion of the signal received over the channel is mainly used to detect the channel information. This signal is referred to as a pilot signal or a reference signal.

In the case in which data is transmitted and received using multiple antennas, a channel state between a transmit antenna and a receive antenna needs to be recognized to receive a correct signal. Accordingly, a separate RS is needed for each transmit antenna, more specifically, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) allowing the BS to measure UL channel quality at frequencies for different networks.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for two purposes of acquisition of channel information and data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 5 is a diagram illustrating a pattern in which CRSs and DRSs defined in legacy 3GPP LTE (e.g., Release-8) are mapped to resource block (RB) pairs. A downlink RB pair, a unit in which an RS is mapped, may be represented as a unit of one subframe in the time domain times 12 subcarriers in the frequency domain. That is, one RB pair has a length of 14 OFDM symbols for a normal CP (FIG. 6($a$)) and a length of 12 OFDM symbols for an extended CP (FIG. 6($b$)).

In FIG. 5, the positions of RSs in an RB pair for a system where a BS (eNB) supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Demodulation Reference Signal (DMRS)

DMRS is a reference signal defined to allow a UE to perform channel estimation for a PDSCH. The DMRS may be used in transmission modes 7, 8 and 9. The DMRS was initially defined for single layer transmission of antenna port 5. Over time, the definition has expanded to cover spatial multiplexing of up to eight layers. As the term "UE-specific RS", which is another name for the DMRS, suggests, the DMRS is transmitted only for a single specific UE, and accordingly it may be transmitted only in RBs in which a PDSCH for the specific UE is transmitted.

Figure 6:
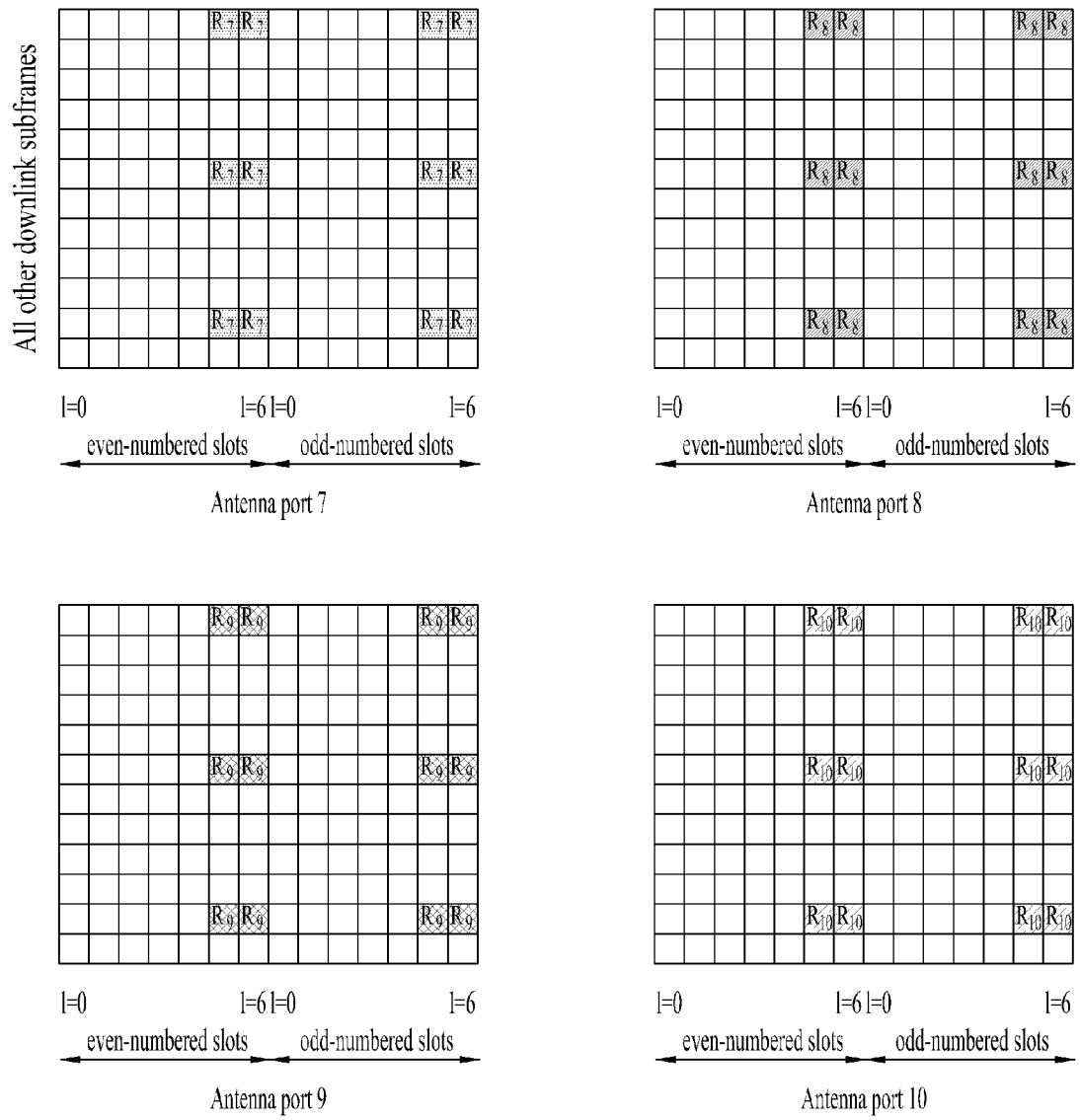
FIG. 6 illustrates a demodulation reference signal.

Hereinafter, description will be given of generation of a DMRS for up to eight layers. The DMRS may be transmitted with a reference-signal sequence r(m), which is generated according to Equation 1 given below, and mapped to complex-valued modulation symbols $a_{k,l}^{(p)}$, which are generated according to Equation 2 given below. FIG. 6 illustrates antenna ports 7 to 10 with the DMRS mapped to a resource grid in subframes according to Equation 6 in the case of a normal CP.

$$r(m) = \frac{1}{\sqrt{2}}(1 - 2 \cdot c(2m)) + j\frac{1}{\sqrt{2}}(1 - 2 \cdot c(2m+1)), \quad \text{Equation 1}$$

$$m = \begin{cases} 0, 1, \ldots, 12N_{RB}^{max,DL} - 1 & \text{Normal } CP \\ 0, 1, \ldots, 16N_{RB}^{max,DL} - 1 & \text{Extended } CP \end{cases}$$

Herein, r(m) denotes a reference-signal sequence, c(i) denotes a pseudo-random sequence, and $N_{RB}^{max, DL}$ denotes a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m') \quad \text{Equation 2}$$

$$w_p(i) = \begin{cases} \overline{w}_p(i) & (m' + n_{PRB}) \bmod 2 = 0 \\ \overline{w}_p(3 - i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = $$

$$\begin{cases} l' \bmod 2 + 2 & \text{for special subframe configurations 3, 4, 8 and 9} \\ l' \bmod 2 + 2 + 3\lfloor l'/2 \rfloor & \text{for special subframe configurations 1, 2, 6 and 7} \\ l' \bmod 2 + 5 & \text{for subframes other than the special subframes} \end{cases}$$

$$l' = \begin{cases} 0, 1, 2, 3 & n_s \bmod 2 = 0, \text{ and special subframe configurations 1, 2, 6 and 7} \\ 0, 1 & n_s \bmod 2 = 0, \text{ and special subframe configurations 1, 2, 6 and 7} \\ 2, 3 & n_s \bmod 2 = 1, \text{ and configurations other than special subframe configurations 1, 2, 6 and 7} \end{cases}$$

$$m' = 0, 1, 2$$

As can be seen from Equation 2, when a reference-signal sequence is mapped to complex demodulation symbols, an orthogonal sequence $\overline{w}_p(i)$ shown in Table 1 below is applied according to antenna ports.

TABLE 1

| Antenna port $p$ | [$\overline{w}_p(0)$ $\overline{w}_p(1)$ $\overline{w}_p(2)$ $\overline{w}_p(3)$] |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The DMRSs may be used to perform channel estimation using different methods according to the spreading factor (2 or 4). Referring to Table 1, the spreading factor for antenna ports 7 to 10 is 2 since the orthogonal sequences for the antenna ports are repeated in the pattern of [a b a b]. The spreading factor for antenna ports 11 to 14 is 4. When the spreading factor is 2, a UE may perform channel estimation by despreading the DMRS of the first slot and the DMRS of the second slot respectively using the spreading factor of 2 and then performing time interpolation. When the spreading factor is 4, channel estimation may be performed by despreading the DMRSs in all subframes simultaneously using the spreading factor of 4.

When the spreading factor is 2, channel estimation according to the spreading factor may obtain a gain by applying time interpolation in high mobility situations and a gain in decoding time according to despreading allowed for the DMRS of the first slot. When the spreading factor of 4 is used, more UEs or ranks can be supported.

Figure 7:
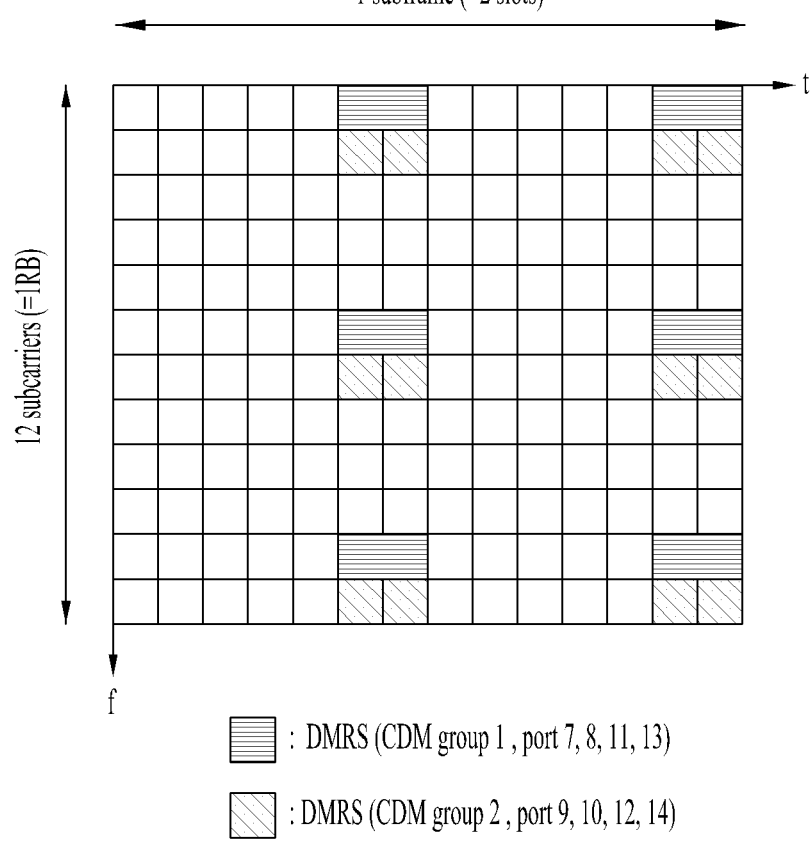
FIG. 7 is a diagram illustrating a code divisional multiplexing (CDM) group.

Hereinafter, description will be given in terms of DMRS overhead with reference to FIG. 7. FIG. 7 illustrates mapping of a DMRS onto a subframe for each of antenna ports 7 to 14. As shown in FIG. 7, antenna ports may be divided into Code Divisional Multiplexing (CDM) group 1 (or a first antenna port group) and CDM group 2 (or a second antenna port group) according to locations on the resource grid to which the DMRSs are mapped. The DMRSs on antenna ports 7, 8, 11 and 13 are transmitted on REs corresponding to CDM group 1, and the DMRSs on antenna ports 9, 10, 12 and 14 are transmitted on REs corresponding to CDM group 2. In other words, the DMRSs on the antenna ports included in one CDM group are transmitted on the same REs. When only antenna ports corresponding to CDM group 1 are used to transmit DMRSs, the number of resources necessary for the DMRSs, namely the DMRS overhead, is 12. Similarly, when antenna ports corresponding to CDM group 2 are used, the DMRS overhead is 24.

As described above, up to 8 layers (rank 8) can be supported for the DMRSs, which is in line with a legacy LTE-A system in which up to 8 layers are supported for an eNB configured to have up to 8 antennas in PDSCH transmission to ensure downlink spatial multiplexing of SU-MIMO. However, the legacy DMRS structure cannot support 3D MIMO, Massive MIMO, etc. in which transmission is performed on more than 8 layers. In this regard, a description will be given below of a new DMRS structure for supporting more layers than in the legacy system, which supports up to 8 layers, particularly up to 16 layers.

Physical Broadcast Channel (PBCH)

Figure 8:
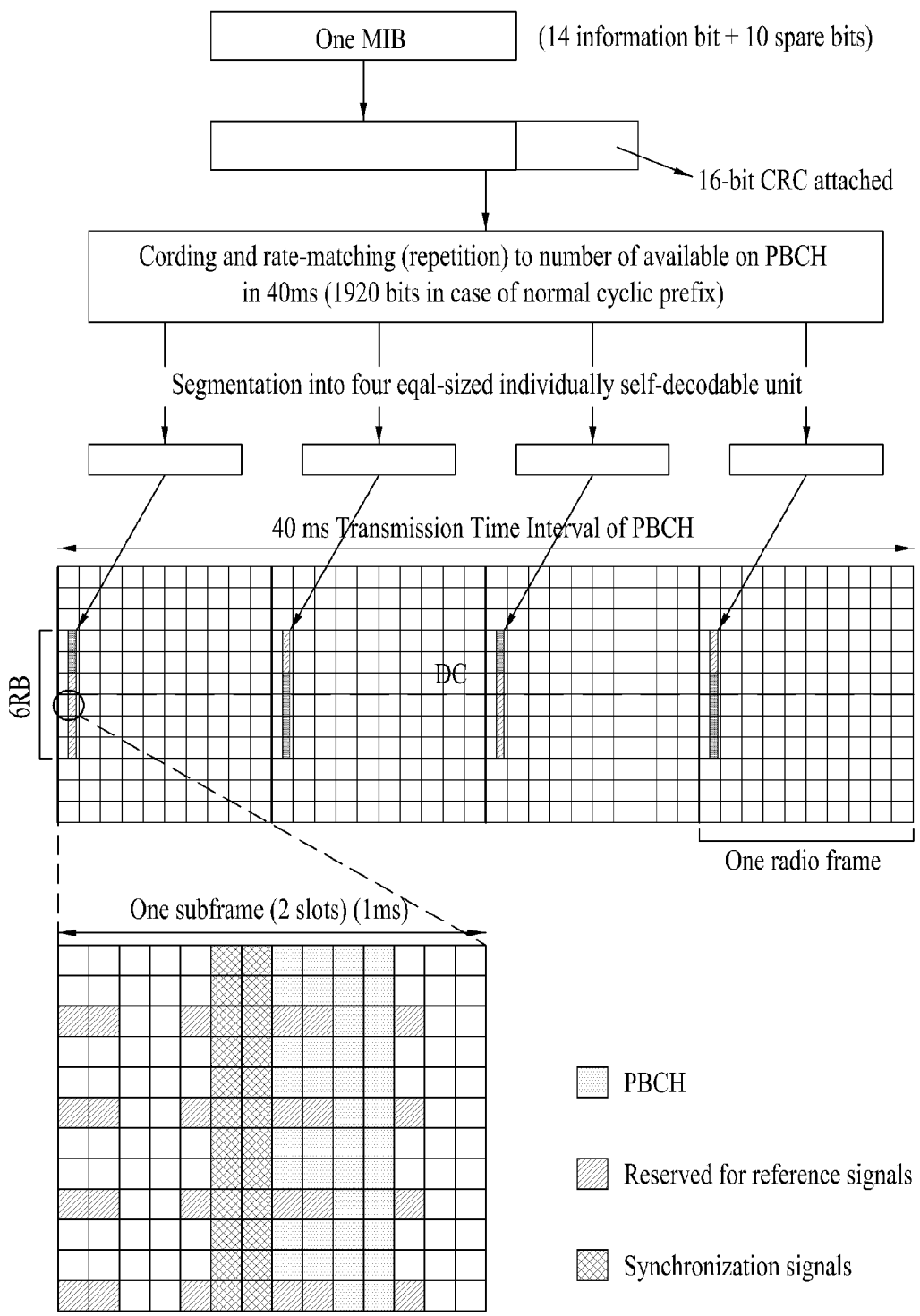
FIG. 8 is a diagram illustrating a physical broadcast channel (PBCH)

FIG. 8 is a diagram illustrating a PBCH. The PBCH is a channel on which system information corresponding to a master information block (MIB) is transmitted. The PBCH is used for a UE to acquire the system information after acquiring synchronization through synchronization signals (PSS/SSS) and then a cell identifier. Herein, the MIB may include downlink cell bandwidth information, PHICH configuration information, and a subframe number (a system frame number (SFN)).

As shown in FIG. 8, one MIB transmission block is transmitted after a 16-bit CRC is attached to the transmission block, channel coding and rate matching are performed for the transmission block and then the transmission block is mapped to antenna ports. The coded transmission block may be transmitted through the first subframe of each of four contiguous radio frames. Accordingly, a PBCH carrying one MIB is transmitted every 40 ms. In each subframe, the coded transmission block is transmitted by being mapped to a resource region corresponding to 6 RBs in the middle of the full downlink frequency band in the frequency axis and first four OFDM symbols of the second slot in the time axis.

The PBCH is transmitted on 74 subcarriers, which correspond to the smallest downlink bandwidth of 6 RBs, in the middle of an entire bandwidth in the frequency axis. This is intended to allow the PBCH to be normally decoded even when the UE does not know the size of the system bandwidth.

Transmission of System Information on a New Carrier Type (NCT)

The descriptions given above basically assume a carrier (which may be referred to as a legacy carrier type (LCT)) on which CRS is transmitted over the full band in at least some OFDM symbols at the front part of all subframes. Introduction of a new carrier type (NCT) other than the LTC is under consideration. On the NCT, neither the CRS nor the PDCCH is transmitted, but a tracking RS (TRS) may be transmitted. Since the CRS is not transmitted on the NCT, a problem may occur when decoding based on channel estimation through the CRS is applied to the PBCH. Hereinafter, description will be given of elements which are needed to transmit the PBCH on the NCT.

DMRS Antenna Port Information

For the NCT, the CRS is not present in a subframe. Accordingly, the PBCH needs to be decoded based on the DMRS. In this case, the UE needs to be aware of DMRS antenna port information related to the PBCH.

The UE may detect the number of antenna port for the CRS by applying blind decoding to a CRC mask of the MIB. More specifically, on the LCT (namely, when the CRS is present in a subframe), the UE performs error checking by performing modulo 2 operation by adding a PBCH CRC mask (a sequence masked on a PBCH CRC parity bit) to a CRC parity part and dividing the bits including the parity part determined through the modulo operation by a CRC generation polynomial. If it is determined that there is no error, the number of antenna ports indicated (mapped) by the sequence that is used is the number of CRS antenna ports.

In the case of NCT, the number of CRS antenna ports may be mapped to DMRS antenna port numbers as shown in Table 2 below.

| Number of transmit antenna ports at eNodeB | Antenna port number |
| --- | --- |
| 1 | {7} |
| 2 | {7, 8} or {7, 9} |
| 3(4) | {7, 8, 9, 10} |

Herein, DMRS antenna port {7} is set as a specific antenna port since the UE performing initial access needs to decode the PBCH without having any other information provided. When the number of antenna ports is 2, two combinations of {7, 8} and {7, 9} are possible. For the combination {7, 8}, the DMRS overhead is 12 and thus more REs for information transmission may be secured than when the other combination is used. When the combination {7, 9} is used, the SNR is 3 dB greater than the SNR for the combination {7, 8}, and thus channel estimation accuracy is higher than in the combination {7, 8}. Accordingly, when two antenna ports are used, both combinations {7, 8} and {7, 9} may be included in a blind decoding set, or only one thereof may be used to reduce the number of blind decodings. In particular, since even cell boundary users are required to accurately decode the PBCH, combination {7, 9} providing higher channel estimation accuracy may be used.

Alternatively, DMRS antenna port information of the NCT (when the CRS is not present in a subframe) may be mapped to sequences masked on the CRC parity bits. In other words, for the NCT, sequences masked on the CRC parity bits may be configured to indicate DMRS antenna ports associated with PBCH decoding. An example of this case is shown in Table 3 below.

TABLE 3

| Number of transmit antenna ports at eNodeB | PBCH CRC mask $<x_{ant,\ 0},\ x_{ant,\ 1},\ \ldots,\ x_{ant,\ 15}>$ |
| --- | --- |
| 1 (AP port number: {7}) | <0, 0, 0, 0, 0, 0, 0, 0, 0, 0, 0, 0, 0, 0, 0, 0> |
| 2 (AP port number: {7, 8} or {7, 9}) | <1, 1, 1, 1, 1, 1, 1, 1, 1, 1, 1, 1, 1, 1, 1, 1> |
| 4 (AP port number: {7, 8, 9, 10}) | <0, 1, 0, 1, 0, 1, 0, 1, 0, 1, 0, 1, 0, 1, 0, 1> |

Referring to Table 2, each of multiple sequences masked on the CRC may be mapped to the number of CRS antenna ports in the case of the LCT, or to the DMRS antenna port information in the case of the NCT (1, 2 and 4 for the number of antenna ports may indicate the number of DMRS antenna ports in the case of the NCT). That is, the sequences indicating the numbers of antenna ports 1, 2 and 4 in the case of the LCT may indicate DMRS antenna ports {7}, {7, 9}, and {7, 8, 9, 10}, respectively.

Types of Reference Signals Used in Decoding

As a reference signal to be used for PBCH decoding, the TRS may be considered in addition to the DMRS mentioned above. For the NCT, the TRS, which is for interference measurement and tracking, may be transmitted on predetermined time-frequency resources with a certain periodicity (of, for example, 5 ms). The PBCH transmission periodicity (40 ms) may be a multiple of the TRS transmission periodicity (5 ms). Accordingly, when the PBCH is transmitted on one antenna port, the TRS may be used for PBCH decoding. If the TRS is used for PBCH decoding, spatial diversity may be not be obtained, but decoding of other types of channels (e.g., PDSCH, ePDCCH (common search space)) multiplexed in the PRB pair for the PBCH may be performed without additional signaling.

Necessity of use of the TRS for PBCH decoding may be signaled to the UE by addition of a decoding option to the MIB CRC mask. Alternatively, DMRS demodulation may be set not to be performed when the number of antenna ports set to 1. In this case, antenna port 1 in the CRC mask of the existing MIB may be assigned to the TRS.

Table 4 below shows a specific example in which sequences masked on the CRC parity bits indicate the types of RS associated with PBCH decoding. As exemplarily shown in Table 4, in the case of the NCT, a sequence (<0, 0, 0, 0, 0, 0, 0, 0, 0, 0, 0, 0, 0, 0, 0, 0>) used to indicate that the number of antenna ports is 1 for the LCT may indicate the TRS as a type of reference signal associated with decoding of the system information, and sequences (<1, 1, 1, 1, 1, 1, 1, 1, 1, 1, 1, 1, 1, 1, 1, 1> and <0, 1, 0, 1, 0, 1, 0, 1, 0, 1, 0, 1, 0, 1, 0, 1>) used to indicate that the number of ports is 2 for the LCT may indicate the DMRS as a type of reference signal associated with decoding of the system information.

TABLE 4

| Number of transmit antenna ports at eNodeB | PBCH CRC mask $<x_{ant,\ 0},\ x_{ant,\ 1},\ \ldots,\ x_{ant,\ 15}>$ |
| --- | --- |
| 1 (TRS based) | <0, 0, 0, 0, 0, 0, 0, 0, 0, 0, 0, 0, 0, 0, 0, 0> |
| 2 (DMRS based) | <1, 1, 1, 1, 1, 1, 1, 1, 1, 1, 1, 1, 1, 1, 1, 1> |

TABLE 4-continued

| Number of transmit antenna ports at eNodeB | PBCH CRC mask $<x_{ant,\,0},\,x_{ant,\,1},\,\ldots,\,x_{ant,\,15}>$ |
|---|---|
| 4 (DMRS based) | <0, 1, 0, 1, 0, 1, 0, 1, 0, 1, 0, 1, 0, 1, 0, 1> |

Diversity Scheme Information

When the PBCH is transmitted based on the DMRS, an arbitrary precoder may be applied to DMRS/PBCH, and a precoder applied to a specific channel multiplexed in the same PRB pair for the PBCH may be applied to the PBCH. In this case, the number of antenna ports used for transmission of the PBCH may depend on the performance of a cell boundary UE. On the PRB pair on which the PBCH is transmitted, a diversity gain may be obtained through precoder cycling in the frequency axis. Herein, precoder cycling refers to a method to obtain a precoding diversity by applying different precoding to each RB (or RE group). A precoder applied to each antenna port is preferably set to maximize the chordal distance. Precoder cycling may be applied on an RE/PRB pair-by-RE/PRB pair basis. For example, when the number of antenna ports is 2, a channel may be estimated using antenna ports (APs) {7, 8} or {7, 9}. For such precoder randomization/cycling, the spatial multiplexing technique may be predetermined or dynamically determined. In the case in which the spatial multiplexing technique is dynamically determined, the diversity scheme information may be indicated by a sequence masked on the CRC parity bits as exemplarily shown in Table 5.

TABLE 5

| Number of transmit antenna ports at eNodeB | PBCH CRC mask $<x_{ant,\,0},\,x_{ant,\,1},\,\ldots,\,x_{ant,\,15}>$ |
|---|---|
| 1 | <0, 0, 0, 0, 0, 0, 0, 0, 0, 0, 0, 0, 0, 0, 0, 0> |
| 2 (SFBC) | <1, 1, 1, 1, 1, 1, 1, 1, 1, 1, 1, 1, 1, 1, 1, 1> |
| 4 (FSBC/FSTD) | <0, 1, 0, 1, 0, 1, 0, 1, 0, 1, 0, 1, 0, 1, 0, 1> |
| 2 (for CDD or precoder cycling) | <1, 1, 1, 1, 0, 0, 0, 0, 1, 1, 1, 1, 0, 0, 0, 0> |
| 4 (for CDD or precoder cycling) | <1, 1, 1, 1, 1, 1, 1, 1, 0, 0, 0, 0, 0, 0, 0, 0> |

Referring to Table 5, in the case of the NCT, the sequence (<1, 1, 1, 1, 1, 1, 1, 1, 1, 1, 1, 1, 1, 1, 1, 1>) which would indicate 2 as the number of antenna ports in the case of the LCT may indicate that precoding used for the DMRS/PBCH has been performed based on SFBC, namely Table 6 given below.

TABLE 6

|  | Frequency unit resource n | Frequency unit resource n + 1 |
|---|---|---|
| Antenna port 0 | S0 | S1 |
| Antenna port 1 | −S1* | S0* |

(In this table, Sx denotes system information mapped to layer x, and *denotes a complex conjugate.)

In addition, the sequence (<0, 1, 0, 1, 0, 1, 0, 1, 0, 1, 0, 1, 0, 1, 0, 1>) which would indicate 4 as the number of antenna ports in the case of the LCT may indicate that precoding used for the DMRS/PBCH has been performed based on Table 7 given below.

TABLE 7

|  | Frequency unit resource n | Frequency unit resource n + 1 | Frequency unit resource n + 2 | Frequency unit resource n + 3 |
|---|---|---|---|---|
| Antenna port 0 | S0 | S1 | 0 | 0 |
| Antenna port 1 | 0 | 0 | S2 | S3 |
| Antenna port 2 | −S1* | S0* | 0 | 0 |
| Antenna port 3 | 0 | 0 | −S3* | S2* |

In Table 5, the sequence (<1, 1, 1, 1, 0, 0, 0, 0, 1, 1, 1, 1, 0, 0, 0, 0>) indicates that cyclic delay diversity (CDD)/precoder cycling has been applied to DMRS/PBCH transmission for two antenna ports, while the sequence (<1, 1, 1, 1, 1, 1, 1, 1, 0, 0, 0, 0, 0, 0, 0, 0>) indicates that CDD/precoder cycling has been applied to DMRS/PBCH transmission for four antenna ports. Specifically, specific sequences for antenna ports 2 and 4 may have matrices shown in Table 8 as constituent matrices of a precoding matrix.

TABLE 8

| Number of layers | Constituent matrix |
|---|---|
| 2 | $\begin{bmatrix} 1 & 0 \\ 0 & e^{-j2\pi i/2} \end{bmatrix}$ |
| 3 | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

In the case of the NCT, when the PBCH is transmitted in a frequency band narrower than 6 RBs which is in the middle of the full frequency band, randomly determining a DMRS precoder may provide a very bad selection to a specific UE. The bad selection may be prevented by applying the CDD. In other words, since the PBCH needs to be transmitted over a beam which will be well recognized by all UEs, CDD allowing implementation of beamforming in a different pattern on each RE is effective. If a CDD of an RE level is applied, a frequency diversity may be obtained even within one PRB.

PDSCH Multiplexing

The number of antenna ports for the PBCH may be determined based on a cell boundary UE/cell radius. In this case, if the PBCH and the PDSCH are multiplexed in the same PRB pair, the information about the number of antenna ports for the PBCH may be delivered to a UE/UE group receiving the PDSCH.

If the PDSCH and the PBCH share antenna ports, a part or the entirety of a precoder used for the PBCH may be used for the PDSCH or be randomly configured. If the rank of the PDSCH is lower than that of the PBCH, additional signaling may be needed depending on whether or not the antenna ports for the PBCH are used. For example, if the PBCH uses antenna ports 7 and 9, and the rank of PDSCH is 1, the PDSCH cannot be transmitted at the locations of the antenna ports for the PBCH, and therefore it needs to inform the UE/UE group that the number of REs used for an RS within one PRB pair is 24. If the PBCH uses antenna ports 7 and 8 and the rank of the PDSCH is 1, the eNB may deliver information about whether or not the PDSCH is multiplexed with the PBCH to allow the UE to predict the RS power. In this case, when the minimum mean square error (MMSE) equalizer is used, the UE predicts the noise level based on this information. Signaling mentioned above may be implemented when the rank of the PDSCH is less than or equal to the number of PBCH antenna ports and the PBCH uses a DMRS antenna port which uses 24 REs in one PRB pair. This operation may be applied to only a PRB pair in which the PBCH and the PDSCH are multiplexed or may be consistently applied to all PRB pairs. In the former case, it is needed to signal the PRB pair in which the PBCH and the PDSCH are multiplexed. In addition, rate matching may be applied to only this PRB pair. In the other PRB pairs, other RSs may be freely selected. In the latter case, rate matching may be consistently applied to all PRB pairs, and thus this case is advantageous in terms of implementation.

In the case in which the precoder of the PBCH and the precoder of the PDSCH are differently applied, for example, in the case in which the precoder of the PDSCH is precoded on a channel of a specific UE/UE group, the antenna ports used for the PBCH may be different from those for the PDSCH. In this case, the highest rank of the PDSCH may be min(Nt,Nr)-$M_{PBCH}$. Herein, Nt denotes the number of transmit antennas, Nr denotes the number of receive antennas, and $M_{PBCH}$ denotes the number of antenna ports for the PBCH. The highest rank of the PDSCH, i.e., min(Nt,Nr)-$M_{PBC}$ may be signaled to the UE/UE group such that it is used as CSI feedback. The UE/UE group may estimate a channel on antenna ports other than the PBCH antenna ports, and perform rate matching in consideration of whether or not the PBCH antenna ports are used. For example, suppose that the PBCH uses antenna port 9, and the PDSCH uses antenna port 7. In this case, the PDSCH uses a single antenna port, and thus 12 REs per PRB pair are used for an RS, but rate matching is performed without mapping the REs to the location of antenna port 9 assuming overhead of 24 REs in consideration of antenna port 9 for the PBCH. In other words, a rule stating that the PDSCH should not be mapped to REs (including the existing PDSCH DMRS) used for the AP for the PBCH may be defined. Such operation may be applied only to the PRB pair in which the PBCH and the PDSCH are multiplexed, or may be consistently applied to all PRB pairs. In the former case, it is needed to signal the PRB pair in which the PBCH and the PDSCH are multiplexed. In addition, rate matching may be applied to only this PRB pair. In other PRB pairs, other RSs may be freely selected. In the latter case, rate matching may be consistently applied to all PRB pairs, and thus this case is advantageous in terms of implementation.

If the EPDCCH and the PBCH are multiplexed in the same PRB pair, particularly, if a precoder randomization/cycling technique used for the PBCH is used for the EPDCCH, the EPDCCH and the PBCH may share antenna ports. The EPDCCH and the PBCH may also share antenna ports when SFBC/FSTD is used to transmit the PBCH. The UE may infer the number of antenna ports for the EPDCCH from the number of antenna ports for the PBCH. For example, when the number of antenna ports for the PBCH is 1, decoding may be performed assuming that the number of antenna ports for the EPDCCH is also 1. Alternatively, in order to improves channel estimation performance, channel estimation results may be averaged when the same precoding is applied to two different antenna ports. If the number of antenna ports for the EPDCCH differs from that for the PBCH, the antenna ports for the PBCH may be part or all of the antenna ports for the EPDCCH.

Figure 9:
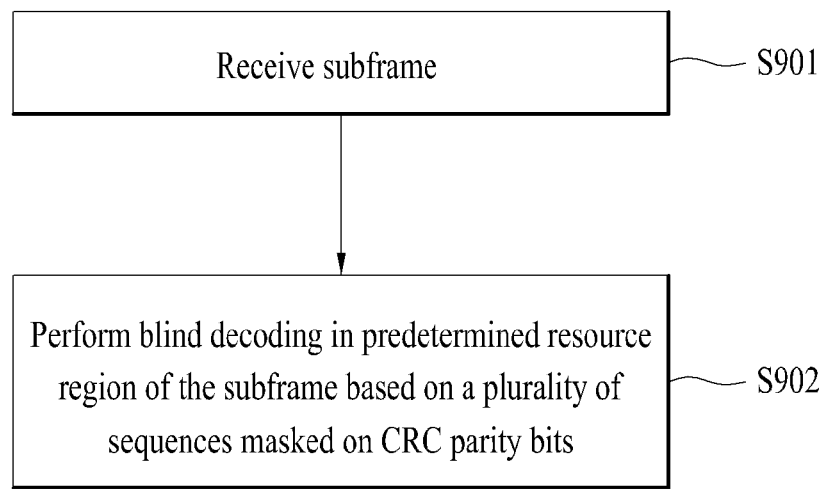
FIG. 9 is a diagram illustrating operation of a user equipment (UE) according to one embodiment of the present invention.

FIG. 9 is a flowchart illustrating a method to acquire, through a sequence masked on the CRC parity bits, elements needed for a UE to receive the PBCH on the NCT as described above.

In step S901, the UE receives subframes. Herein, the subframes may be the first subframes of radio frames. In step S902, the UE performs PBCH blind decoding in a predetermined resource region. Herein, in performing error checking using CRC, a plurality of sequences masked on the CRC parity bits may be used. If the subframes are of the NCT, namely if the CRS is not transmitted in the subframes, each of the sequences may indicate individual information included in at least one of an RS type set, a DMRS antenna port information set, and a diversity scheme information set. For details of each case, refer to descriptions given above in the DMRS Antenna Port Information, 'Types of Reference Signals Used in Decoding, and Diversity Scheme Information sections.

Configuration of Apparatus According to Embodiment of the Present Invention

Figure 10:
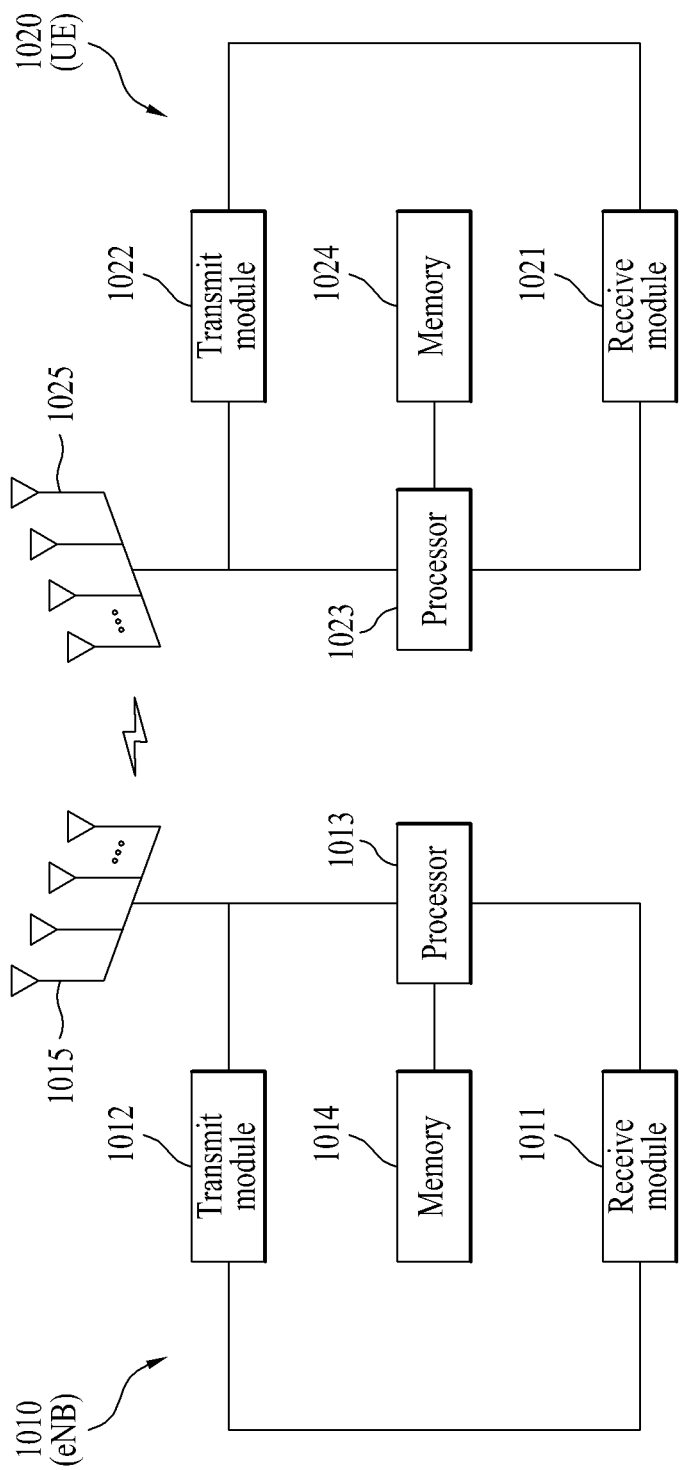
FIG. 10 is a diagram illustrating configuration of transceivers.

FIG. 10 is a diagram illustrating configurations of a transmit point and a UE according to one embodiment of the present invention.

Referring to FIG. 10, a transmit point 1010 may include a receive module 1011, a transmit module 1012, a processor 1013, a memory 1014, and a plurality of antennas 1015. The antennas 1015 represent a transmission point that supports MIMO transmission and reception. The receive module 1011 may receive various signals, data and information from a UE on uplink. The transmit module 1012 may transmit various signals, data and information to a UE on downlink. The processor 1013 may control overall operation of the transmit point 1010.

The processor 1013 of the transmit point 1010 according to one embodiment of the present invention may perform operations necessary for the embodiments described above.

Additionally, the processor 1013 of the transmit point 1010 may function to computationally process information received by the transmit point 1010 or information to be transmitted to the outside, etc. The memory 1014, which may be replaced with an element such as a buffer (not shown), may store the computationally processed information for a predetermined time.

Referring to FIG. 10, a UE 1020 may include a receive module 1021, a transmit module 1022, a processor 1023, a memory 1024, and a plurality of antennas 1025. The antennas 1025 mean that the UE supports MIMO transmission and reception. The receive module 1021 may receive various signals, data and information from a transmit point on downlink. The transmit module 1022 may transmit various signals, data and information to the transmit point on uplink. The processor 1023 may control overall operation of the UE 1020.

The processor 1023 of the UE 1020 according to one embodiment of the present invention may perform operations necessary for the embodiments described above.

Additionally, the processor 1023 may function to computationally process information received by the UE 1020 or information to be transmitted to the outside, and the memory 1024, which may be replaced with an element such as a buffer (not shown), may store the computationally processed information for a predetermined time.

The detailed configurations of the transmit point and the UE as described above may be implemented such that the various embodiments described above are independently applied or two or more thereof are simultaneously applied, and description of redundant parts is omitted for clarity.

Description of the transmit point 1010 in FIG. 10 may also be applied to a relay which serves as a downlink transmitter or an uplink receiver, and description of the UE 1020 may be equally applied to a relay which serves as a downlink receiver or an uplink transmitter.

The embodiments of the present invention may be implemented through various means, for example, hardware, firmware, software, or a combination thereof. When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit may be located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for receiving system information at a user equipment (UE) in a wireless communication system, the method comprising:
   receiving a subframe; and
   performing blind decoding for a physical broadcast channel (PBCH) in a predetermined resource region of the subframe, based on a plurality of sequences masked on cyclic redundancy check (CRC) parity bits,
   wherein, when a cell-specific reference signal (CRS) is not present in the subframe,
   each of the plurality of sequences indicates one of a plurality of demodulation reference signal (DMRS) antenna port sets, or
   each of the plurality of sequences indicates one of a plurality of diversity scheme sets, or
   each of the plurality of sequences indicates one of a tracking reference signal (TRS) and a DMRS as a type of a reference signal,
   wherein, when each of the plurality of sequences indicates one of the plurality of diversity scheme sets, a sequence among the plurality of sequences indicates that precoding of the system information has been performed based on the following table:

|  | Frequency unit resource n | Frequency unit resource n + 1 | Frequency unit resource n + 2 | Frequency unit resource n + 3 |
|---|---|---|---|---|
| Antenna port 0 | S0 | S1 | 0 | 0 |
| Antenna port 1 | 0 | 0 | S2 | S3 |
| Antenna port 2 | −S1* | S0* | 0 | 0 |
| Antenna port 3 | 0 | 0 | −S3* | S2* | wherein Sx denotes system information mapped to layer x, and *denotes a complex conjugate.

2. The method according to claim 1,
   wherein a sequence masked on a PBCH CRC parity bit among the plurality of sequences indicates at least one DMRS antenna port associated with the PBCH.

3. The method according to claim 1,
   wherein each of the plurality of sequences indicates one of DMRS antenna ports {7}, {7, 9}, and {7, 8, 9, 10}, respectively.

4. The method according to claim 1, further comprising:
   determining a number of antenna ports for an enhanced physical downlink control channel (EPDCCH) based on a number of antenna ports for the PBCH, when the EPDCCH and the PBCH are multiplexed in the subframe.

5. The method according to claim 1,
   wherein a sequence among the plurality of sequences indicates the TRS as the type of a reference signal associated with decoding of the system information, and
   wherein another sequence among the plurality of sequences indicates the DMRS as the type of the reference signal associated with decoding of the system information.

6. The method according to claim 5,
   wherein the another sequence indicates DMRS antenna ports {7, 9} or {7, 8, 9, 10}.

7. The method according to claim 1, wherein, when the predetermined resource region includes fewer than 6 resource blocks, a precoding matrix used in transmitting the system information has a matrix according to the following table as a constituent matrix:

| Number of layers | Constituent matrix |
|---|---|
| 2 | $\begin{bmatrix} 1 & 0 \\ 0 & e^{-j2\pi i/2} \end{bmatrix}$ |

-continued

| Number of layers | Constituent matrix |
|---|---|
| 3 | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$. |

8. The method according to claim 1, wherein, when a physical downlink shared channel (PDSCH) and the PBCH are multiplexed in the subframe, and a first antenna port associated with the PDSCH differs from a second antenna port associated with the PBCH, the UE performs rate matching in consideration of the second antenna port in receiving the PDSCH.

9. A user equipment in a wireless communication, the user equipment comprising:
a radio frequency (RF) module; and
a processor operably coupled with the RF module,
wherein the processor is configured to perform blind decoding for a physical broadcast channel (PBCH) in a predetermined resource region of a received subframe, based on a plurality of sequences masked on cyclic redundancy check (CRC) parity bits,
wherein, when a cell-specific reference signal (CRS) is not present in the subframe,
each of the plurality of sequences indicates one of a plurality of demodulation reference signal (DMRS) antenna port sets, or
each of the plurality of sequences indicates one of a plurality of diversity scheme sets, or
each of the plurality of sequences indicates one of a tracking reference signal (TRS) and a DMRS as a type of a reference signal,
wherein, when each of the plurality of sequences indicates one of the plurality of diversity scheme sets, a sequence among the plurality of sequences indicates that precoding of the system information has been performed based on the following table:

|  | Frequency unit resource n | Frequency unit resource n + 1 | Frequency unit resource n + 2 | Frequency unit resource n + 3 |
|---|---|---|---|---|
| Antenna port 0 | S0 | S1 | 0 | 0 |
| Antenna port 1 | 0 | 0 | S2 | S3 |
| Antenna port 2 | −S1* | S0* | 0 | 0 |
| Antenna port 3 | 0 | 0 | −S3* | S2* | wherein Sx denotes system information mapped to layer x, and *denotes a complex conjugate.

* * * * *